United States Patent Office.

THE BARRON'S PATENT-STEEL MANUFACTURING COMPANY, OF NEW YORK, N. Y., ASSIGNEES OF THOMAS J. BARRON.

*Letters Patent No.* 60,823, *dated January* 1, 1867; *reissue No.* 3,920, *dated April* 12, 1870.

IMPROVEMENT IN CONVERTING IRON INTO STEEL.

The Schedule referred to in these Letters Patent and making part of the same.

*To all whom it may concern:*

Be it known that THOMAS J. BARRON, of Brooklyn, in the county of Kings and State of New York, invented a new and improved Method or Process of Converting Iron into Steel; and that the following is a full, clear, and exact description thereof, and of its mode or manner of operation.

The said invention or discovery consists in converting iron—*i. e.*, wholly or partly decarbonized iron—into steel, after the metal is formed or fashioned into any shape desired or required, and more or less deeply, as found useful or necessary, by the application of gases brought in contact with the metal while hot, and acting in combination with any suitable apparatus for heating such metal.

The gases used for such purpose of converting iron into steel are or may be carbureted hydrogen, in combination with nitrogen or cyanogen separately or together, or carbureted hydrogen, with nitrogen and carbonic-oxide gas. Ammoniacal gas and chlorine may also be used in the place of or mixed with the nitrogen.

The manner of applying the gases and carrying out this invention is, substantially, as follows:

A furnace is constructed to contain one or more ovens, muffles, or retorts, of such form and adaptation as to receive the iron which it is desired to convert, either partially or wholly into steel. Such retorts are to be brought to a bright red or white heat, according to the character of the steel to be produced, when the iron is placed into them, and the retorts closed. Into such retorts there is then forced or caused to enter, in immediate contact with the iron or metal, a mixture of carbureted hydrogen and nitrogen or cyanogen gas, or of carbureted hydrogen, nitrogen, and carbonic-oxide gas, and either with or without the use of charcoal or other solid carbons or gases derived from the compounds of ammonia. The carbureted hydrogen may be prepared in a separate retort, in the usual manner, or may be generated in the retort containing the metal to be steeled, by slowly admitting into such retort either liquid hydrocarbons, solid hydrocarbons, or nitrogenized, or other fats, which will be decomposed by the heat of the retort and converted into gas. The nitrogen is prepared in the usual manner, and is then forced into the retort in connection with the carbureted hydrogen. A proportion of from one-sixth to one-quarter of nitrogen gas to five-sixths or three-quarters of carbureted hydrogen, will be found sufficient in ordinary cases to produce the result desired; but a larger proportion of nitrogen may be used, provided it is not so great as to drive the hydrocarbon from the surface of the metal, the surplus of the gases not taken up by the iron producing no injurious effect, except, perhaps, a cooling effect upon the heat of the retort, and passing out of the muffle. Cyanogen gas, which is composed of nitrogen and carbon, may be used in place of pure nitrogen; but in such case a little greater proportion of cyanogen than of nitrogen should be used or mixed with the carbureted hydrogen. The gases formed by the decomposition of the muriate, or other salts of ammonia, or of any substance that will produce such gases, may also be used in place of the nitrogen or in connection with it; the latter is deemed the most preferable form of use. A compound or mixed gas, composed of nitrogen and carbonic oxide, with a small proportion of cyanogen, and produced by passing atmospheric air through an air-tight retort filled with charcoal, coke, or other fuel, and heated to ignition, may also be used in combination or connection with the carbureted hydrogen, and, from the nitrogen and carbon contained in it, will be equally efficacious in producing the result mentioned. The facility and cheapness with which such mixed gas is produced recommend it for general use. Articles which it is desired to coat with or convert into steel are allowed to remain in the bath of gases a longer or shorter time, according to the depth of the steel surface required or desired, and the degree of heat to which they are subjected in the retort. With a low degree of heat, a longer time is required to steel the metal to a given depth, and the greater the heat the quicker the action of the gases, and the higher the steel. The time occupied in the process varies from a few seconds to a number of hours, five or six or more in some cases, according to the depth to which it is desired to steel the metal, and the character, and size, and thickness of the iron, and the heat of the furnace. Iron one-sixteenth of an inch thick has thus been converted into good steel in three minutes, and half an inch thick by two inches wide, in one and a half hour. If the heat is high enough, iron will be converted into steel an eighth of an inch deep in from five to ten minutes, and in a much less time when the metal is near a welding heat; but with such extreme heat the metal becomes coarse, and requires reworking. What will be a sufficient time in any case and under different circumstances can be easily determined by the operator by one or two preliminary trials.

When the iron to be coated with or converted into steel is impure, chlorine gas should be admitted into the retort previous to the admission of the carbureted hydrogen and other gases, and should remain in contact with the metal a few minutes or longer time, according to the quality of the iron. Such gas has the effect to carry off or take up any impurities as they are volatilized, which may have been contained in the metal. Such gas may be prepared and forced into the retort or generated therein, as found most convenient. When the iron is pure the use of the chlorine gas may be dispensed with. When the metal has been sufficiently acted on by the gases in the hottest part of the retort, it may be removed to the end or cooler part of the retort, or to another retort connecting therewith, and extending beyond the heat of the fire, and there retained in the bath of gases until it is sufficiently cool to prevent oxidation when it comes in contact with the atmosphere. This manipulation or removal is made when the metal or articles steeled do not require hardening. When any such articles require hardening, the retort connects with or opens into the hardening bath, into which the articles are dropped without exposure to the atmosphere. When the retort cannot be connected with the hardening bath, a jet of the gases should be played upon the metal or articles as they are removed from the retort to the hardening bath, so as to form an atmosphere of gas around them to prevent oxidation. This shielding of the articles from contact with the atmosphere in passing from the retort to the hardening bath, prevents oxidation or discoloration of the surface, and is especially desirable and useful when the article has been polished or finished before being steeled, and it is desired to preserve perfect the finished or polished surface. The retorts containing the metal or articles to be steeled are ventilated, so as to allow the gases to escape therefrom and fresh gas to enter or be generated therein, or a discharge-pipe may be connected therewith, which will conduct the gases passing out of the retort into the fire, where they can be burned as fuel.

What is claimed as the invention of said THOMAS J. BARRON is—

1. The conversion of decarbonized or partially decarbonized iron partly or wholly into steel, after the metal shall have been formed into any desired form or shape, by the application of gases introduced or generated in a retort or other medium, in which the said metal is heated substantially as described.

2. The method herein described of converting wholly or partially decarbonized iron into steel to a greater or lesser depth, by subjecting the said iron while hot to the action of carbureted hydrogen and nitrogen, or cyanogen gas, or of carburreted hydrogen, nitrogen, and carbonic-oxide gas, and either with or without ammonical or chlorine gases.

3. The use, in combination with the process of converting iron into steel by the application of such gases, of chlorine gas, preliminary to such process, for the purpose and in cases as set forth.

4. Protecting the metal, after it has been steeled or converted into steel, and when the same is to be hardened, while being transferred to the hardening bath from contact with the atmosphere, for the purposes set forth.

In testimony whereof, I, SHELDON INGALLS KELLOGG, President of the Barron's Patent-Steel Manufacturing Company, have hereunto set my hand and affixed the seal of the said company, in the presence of two subscribing witnesses.

SHELDON INGALLS KELLOGG,
*President of the Barron's Patent-Steel Manfacturing Company.* [L. S.]

Witnesses:
W. K. MANRIN,
JAMES M. RING.